US012701554B2

(12) United States Patent
Cheng et al.

(10) Patent No.: US 12,701,554 B2
(45) Date of Patent: Aug. 4, 2026

(54) COMMUNICATION DEVICE AND COMMUNICATION METHOD THAT SUPPORT D2D COMMUNICATION

(71) Applicant: 1FINITY Inc., Kawasaki (JP)

(72) Inventors: Huiting Cheng, Yokohama (JP);
Jianming Wu, Kawasaki (JP);
Hongyang Chen, Kawasaki (JP);
Michiharu Nakamura, Yokosuka (JP)

(73) Assignee: 1FINITY Inc., Kawasaki (JP)

( * ) Notice: Subject to any disclaimer, the term of this patent is extended or adjusted under 35 U.S.C. 154(b) by 688 days.

(21) Appl. No.: 17/959,433

(22) Filed: Oct. 4, 2022

(65) Prior Publication Data

US 2023/0024809 A1     Jan. 26, 2023

Related U.S. Application Data

(63) Continuation of application No. PCT/JP2020/016008, filed on Apr. 9, 2020.

(51) Int. Cl.
*H04W 72/04*         (2023.01)
*H04W 72/0446*       (2023.01)
*H04W 92/18*         (2009.01)

(52) U.S. Cl.
CPC ........ *H04W 72/0446* (2013.01); *H04W 92/18* (2013.01)

(58) Field of Classification Search
CPC . H04W 72/0446; H04W 92/18; H04W 72/40; H04W 72/02; H04W 88/04; Y02D 30/70
See application file for complete search history.

(56) References Cited

U.S. PATENT DOCUMENTS

2019/0191461 A1     6/2019  Lee et al.
2021/0029674 A1     1/2021  Uchiyama et al.
(Continued)

FOREIGN PATENT DOCUMENTS

CN      109792640 A      5/2019
EP        3522630 A1 *   8/2019   ........ H04W 72/0446
(Continued)

OTHER PUBLICATIONS

3GPP TS 22.186 V16.2.0, 3rd Generation Partnership Project; Technical Specification Group Services and System Aspects; Enhancement of 3GPP support for V2X scenarios; Stage 1 (Release 16), Jun. 2019.
(Continued)

*Primary Examiner* — Lan-Huong Truong
(74) *Attorney, Agent, or Firm* — Myers Wolin, LLC

(57)            ABSTRACT

A communication device that supports D2D (Device-to-Device) communication includes a processor configured to determine a sensing section for performing sensing based on a position of a first slot in a candidate selection slot set and information regarding a transmission of an aperiodic traffic, the sensing section being formed by a plurality of consecutive slots in a sensing window, the candidate selection slot set including a slot that is configured to transmit a D2D signal; and a sensing unit configured to perform sensing in the sensing section determined by the processor. The processor determines a resource for transmitting the D2D signal in the candidate selection slot set based on a result of the sensing by the sensing unit.

12 Claims, 15 Drawing Sheets

(56)                References Cited

U.S. PATENT DOCUMENTS

2021/0266921 A1     8/2021   Wang et al.
2023/0050353 A1 *   2/2023   Miao ................. H04W 74/0808

FOREIGN PATENT DOCUMENTS

EP          4122257 B1 *   9/2024   ............ H04W 24/08
JP        2019-530325 A    10/2019
JP         2020-17778 A    1/2020
JP         2020017778 A *  1/2020   ............ H04W 72/02
WO        2018/084116 A1   5/2018
WO        2019/187562 A1   10/2019
WO        2020/0024175 A1  2/2020
WO       WO-2020024175 A1 * 2/2020  ........ H04W 74/0808
WO       WO-2020069416 A1 * 4/2020  ........... H04L 1/1887

OTHER PUBLICATIONS

3GPP TS 36.211 V16.0.0, 3rd Generation Partnership Project; Technical Specification Group Radio Access Network; Evolved Universal Terrestrial Radio Access (E-UTRA); Physical channels and modulation (Release 16), Dec. 2019.
3GPP TS 36.212 V16.0.0, 3rd Generation Partnership Project; Technical Specification Group Radio Access Network; Evolved Universal Terrestrial Radio Access (E-UTRA); Multiplexing and channel coding (Release 16), Dec. 2019.
3GPP TS 36.213 V16.0.0, 3rd Generation Partnership Project; Technical Specification Group Radio Access Network; Evolved Universal Terrestrial Radio Access (E-UTRA); Physical layer procedures (Release 16), Dec. 2019.
3GPP TS 36.300 V16.0.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;Stage 2 (Release 16), Dec. 2019.
3GPP TS 36.321 V15.8.0, 3rd Generation Partnership Project; Technical Specification Group Radio Access Network; Evolved Universal Terrestrial Radio Access (E-UTRA); Medium Access Control (MAC) protocol specification (Release 15), Dec. 2019.
3GPP TS 36.322 V15.3.0, 3rd Generation Partnership Project; Technical Specification Group Radio Access Network; Evolved Universal Terrestrial Radio Access (E-UTRA); Radio Link Control (RLC) protocol specification (Release 15), Sep. 2019.
3GPP TS 36.323 V15.5.0, 3rd Generation Partnership Project; Technical Specification Group Radio Access Network; Evolved Universal Terrestrial Radio Access (E-UTRA); Packet Data Convergence Protocol (PDCP) specification (Release 15), Dec. 2019.
3GPP TS 36.331 V15.8.0, 3rd Generation Partnership Project; Technical Specification Group Radio Access Network; Evolved Universal Terrestrial Radio Access (E-UTRA); Radio Resource Control (RRC); Protocol specification (Release 15), Dec. 2019.
3GPP TS 36.413 V16.0.0, 3rd Generation Partnership Project; Technical Specification Group Radio Access Network; Evolved Universal Terrestrial Radio Access Network (E-Utran); S1 Application Protocol (S1AP) (Release 16), Dec. 2019.
3GPP TS 36.423 V16.0.0, 3rd Generation Partnership Project; Technical Specification Group Radio Access Network; Evolved Universal Terrestrial Radio Access Network (E-UTRAN); X2 application protocol (X2AP) (Release 16), Dec. 2019.
3GPP TS 36.425 V15.0.0, 3rd Generation Partnership Project; Technical Specification Group Radio Access Network; Evolved Universal Terrestrial Radio Access Network (E-UTRAN); X2 interface user plane protocol (Release 15), Jun. 2018.
3GPP TS 37.340 V16.0.0, 3rd Generation Partnership Project; Technical Specification Group Radio Access Network; Evolved Universal Terrestrial Radio Access (E-UTRA) and NR; Multiconnectivity; Stage 2 (Release 16), Dec. 2019.
3GPP TS 38.201 V16.0.0, 3rd Generation Partnership Project; Technical Specification Group Radio Access Network; NR; Physical layer; General description (Release 16), Dec. 2019.

3GPP TS 38.202 V16.0.0, 3rd Generation Partnership Project; Technical Specification Group Radio Access Network; NR; Services provided by the physical layer (Release 16), Dec. 2019.
3GPP TS 38.211 V16.0.0, 3rd Generation Partnership Project; Technical Specification Group Radio Access Network; NR; Physical channels and modulation (Release 16), Dec. 2019.
3GPP TS 38.212 V16.0.0, 3rd Generation Partnership Project; Technical Specification Group Radio Access Network; NR; Multiplexing and channel coding (Release 16), Dec. 2019.
3GPP TS 38.213 V16.0.0, 3rd Generation Partnership Project; Technical Specification Group Radio Access Network; NR; Physical layer procedures for control (Release 16), Dec. 2019.
3GPP TS 38.214 V16.0.0, 3rd Generation Partnership Project; Technical Specification Group Radio Access Network; NR; Physical layer procedures for data (Release 16), Dec. 2019.
3GPP TS 38.215 V16.0.1, 3rd Generation Partnership Project; Technical Specification Group Radio Access Network; NR; Physical layer measurements (Release 16), Jan. 2020.
3GPP TS 38.300 V16.0.0, 3rd Generation Partnership Project; Technical Specification Group Radio Access Network; NR; NR and NG-RAN Overall Description; Stage 2 (Release 16), Dec. 2019.
3GPP TS 38.321 V15.8.0, 3rd Generation Partnership Project; Technical Specification Group Radio Access Network; NR; Medium Access Control (MAC) protocol specification (Release 15), Dec. 2019.
3GPP TS 38.322 V15.5.0, 3rd Generation Partnership Project; Technical Specification Group Radio Access Network; NR; Radio Link Control (RLC) protocol specification (Release 15), Mar. 2019.
3GPP TS 38.323 V15.6.0, 3rd Generation Partnership Project; Technical Specification Group Radio Access Network; NR; Packet Data Convergence Protocol (PDCP) specification (Release 15), Jun. 2019.
3GPP TS 38.331 V15.8.0, 3rd Generation Partnership Project; Technical Specification Group Radio Access Network; NR; Radio Resource Control (RRC) protocol specification (Release 15), Dec. 2019.
3GPP TS 38.401 V16.0.0, 3rd Generation Partnership Project; Technical Specification Group Radio Access Network; NG-RAN; Architecture description (Release 16), Dec. 2019.
3GPP TS 38.410 V16.0.0, 3rd Generation Partnership Project; Technical Specification Group Radio Access Network; NG-RAN; NG general aspects and principles (Release 16), Dec. 2019.
3GPP TS 38.413 V16.0.0, 3rd Generation Partnership Project; Technical Specification Group Radio Access Network; NG-RAN; NG Application Protocol (NGAP) (Release 16), Dec. 2019.
3GPP TS 38.420 V15.2.0, 3rd Generation Partnership Project; Technical Specification Group Radio Access Network; NG-RAN; Xn general aspects and principles (Release 15) Dec. 2018.
3GPP TS 38.423 V16.0.0, 3rd Generation Partnership Project; Technical Specification Group Radio Access Network; NG-RAN; Xn application protocol (XnAP) (Release 16), Dec. 2019.
3GPP TS 38.470 V16.0.0, 3rd Generation Partnership Project; Technical Specification Group Radio Access Network; NG-RAN; F1 general aspects and principles (Release 16), Dec. 2019.
3GPP TS 38.473 V16.0.0, 3rd Generation Partnership Project; Technical Specification Group Radio Access Network; NG-RAN; F1 application protocol (F1AP) (Release 16), Dec. 2019.
3GPP TR 38.801 V14.0.0, 3rd Generation Partnership Project; Technical Specification Group Radio Access Network; Study on new radio access technology: Radio access architecture and interfaces (Release 14) Mar. 2017.
3GPP TR 38.802 V14.2.0, 3rd Generation Partnership Project; Technical Specification Group Radio Access Network; Study on New Radio Access Technology Physical Layer Aspects (Release 14) Sep. 2017.
3GPP TR 38.803 V14.2.0, 3rd Generation Partnership Project; Technical Specification Group Radio Access Network; Study on new radio access technology: Radio Frequency (RF) and co-existence aspects (Release 14), Sep. 2017.
3GPP TR 38.804 V14.0.0, 3rd Generation Partnership Project; Technical Specification Group Radio Access Network; Study on New Radio Access Technology; Radio Interface Protocol Aspects (Release 14), Mar. 2017.

(56)     References Cited

OTHER PUBLICATIONS

3GPP TR 38.900 V15.0.0, 3rd Generation Partnership Project; Technical Specification Group Radio Access Network; Study on channel model for frequency spectrum above 6 GHz (Release 15) Jun. 2018.

3GPP TR 38.912 V15.0.0, 3rd Generation Partnership Project; Technical Specification Group Radio Access Network; Study on New Radio (NR) access technology (Release 15), Jun. 2018.

3GPP TR 38.913 V15.0.0, 3rd Generation Partnership Project; Technical Specification Group Radio Access Network; Study on Scenarios and Requirements for Next Generation Access Technologies; (Release 15), Jun. 2018.

International Search Report with Written Opinion of the International Searching Authority issued by the Japan Patent Office for corresponding International Patent Application No. PCT/JP2020/016008, mailed on Sep. 1, 2020, with an English translation.

First Notification of Office Action issued by the China National Intellectual Property Administration for corresponding Chinese Patent Application No. 202080099319.8, dated Dec. 25, 2024, with an English translation.

2nd Notification of Office Action issued by the China National Intellectual Property Administration for corresponding Chinese Patent Application No. 202080099319.8, dated Aug. 20, 2025, with an English translation.

* cited by examiner

| SENSING SCHEME | NUMBER OF SUBFRAMES/SLOTS IN WHICH SENSING IS PERFORMED | REDUCTION RATE OF POWER CONSUMPTION |
|---|---|---|
| FULL RANGE SENSING (FIG. 2) | 1000 | — |
| PARTIAL SENSING (FIG. 3) | 20 | 98 % |
| EMBODIMENT (FIG. 5) | 30 | 97 % |
| COMBINATION (FIG. 9) | 50 | 95 % |

FIG. 10

COMMUNICATION DEVICE AND COMMUNICATION METHOD THAT SUPPORT D2D COMMUNICATION

CROSS-REFERENCE TO RELATED APPLICATION

This application is a continuation application of International Application PCT/JP2020/016008 filed on Apr. 9, 2020 and designated the U.S., the entire contents of which are incorporated herein by reference.

FIELD

The embodiments discussed herein are related to a communication device, a communication method, and a communication system that support Device-to-Device (D2D) communication.

BACKGROUND

Currently, many of the network resources are occupied by traffic used by mobile terminals (including smartphones or feature phones). In addition, it is expected that the traffic used by mobile terminals will continue to increase.

With the development of IoT (Internet of things) services (for example, a transportation system, a smart meter, and a device monitoring system), it is required to support services with various requirements. Therefore, in the standards for the 5th generation mobile communication (5G or NR (New Radio)), there is a demand for technology for realizing the higher data rate, the larger capacity, and the lower delay in addition to the standard technology (for example, non-patent documents 1-12 below) for the 4th generation mobile communication (4G (LTE: Long Term Evolution)). In addition, the standards for the 5th generation mobile communication are being examined by the working group of 3GPP (Third Generation Partnership Project) (for example, TSG-RAN WG1 and TSG-RAN WG2), and the first edition of the standards was released at the end of 2017 (for example, non-patent documents 13-39 below).

LIST OF NON-PATENT DOCUMENTS (1) 3GPP TS 22.186 V16.2.0 (2019-06)
(2) 3GPP TS 36.211 V16.0.0 (2019-12)
(3) 3GPP TS 36.212 V16.0.0 (2019-12)
(4) 3GPP TS 36.213 V16.0.0 (2019-12)
(5) 3GPP TS 36.300 V16.0.0 (2019-12)
(6) 3GPP TS 36.321 V15.8.0 (2019-12)
(7) 3GPP TS 36.322 V15.3.0 (2019-09)
(8) 3GPP TS 36.323 V15.5.0 (2019-12)
(9) 3GPP TS 36.331 V15.8.0 (2019-12)
(10) 3GPP TS 36.413 V16.0.0 (2019-12)
(11) 3GPP TS 36.423 V16.0.0 (2019-12)
(12) 3GPP TS 36.425 V15.0.0 (2018-06)
(13) 3GPP TS 37.340 V16.0.0 (2019-12)
(14) 3GPP TS 38.201 V16.0.0 (2019-12)
(15) 3GPP TS 38.202 V16.0.0 (2019-12)
(16) 3GPP TS 38.211 V16.0.0 (2019-12)
(17) 3GPP TS 38.212 V16.0.0 (2019-12)
(18) 3GPP TS 38.213 V16.0.0 (2019-12)
(19) 3GPP TS 38.214 V16.0.0 (2019-12)
(20) 3GPP TS 38.215 V16.0.1 (2020-01)
(21) 3GPP TS 38.300 V16.0.0 (2019-12)
(22) 3GPP TS 38.321 V15.8.0 (2019-12)
(23) 3GPP TS 38.322 V15.5.0 (2019-03)

(24) 3GPP TS 38.323 V15.6.0 (2019-06)
(25) 3GPP TS 38.331 V15.8.0 (2019-12)
(26) 3GPP TS 38.401 V16.0.0 (2019-12)
(27) 3GPP TS 38.410 V16.0.0 (2019-12)
(28) 3GPP TS 38.413 V16.0.0 (2019-12)
(29) 3GPP TS 38.420 V15.2.0 (2018-12)
(30) 3GPP TS 38.423 V16.0.0 (2019-12)
(31) 3GPP TS 38.470 V16.0.0 (2019-12)
(32) 3GPP TS 38.473 V16.0.0 (2019-12)
(33) 3GPP TR 38.801 V14.0.0 (2017-03)
(34) 3GPP TR 38.802 V14.2.0 (2017-09)
(35) 3GPP TR 38.803 V14.2.0 (2017-09)
(36) 3GPP TR 38.804 V14.0.0 (2017-03)
(37) 3GPP TR 38.900 V15.0.0 (2018-06)
(38) 3GPP TR 38.912 V15.0.0 (2018-06)
(39) 3GPP TR 38.913 V15.0.0 (2018-06)

In addition, the working group of 3GPP also discusses V2X (Vehicle to Everything) communication. V2X includes V2V (Vehicle to Vehicle) for communication between vehicles, V2P (Vehicle to Pedestrian) for communication between a vehicle and a pedestrian, V2I (Vehicle to Infrastructure) for communication between a vehicle and a road infrastructure, and V2N (Vehicle to Network) for communication between a vehicle and a network. In addition, the regulations regarding V2X are described in, for example, 3GPP TS 22.186 V16.2.0 (2019-06). In addition, a communication device that enables more flexible resource allocation in device-to-device communication, such as V2X, has been proposed (for example, WO2019/187562).

In V2X communication, for example, an autonomous resource allocation method (mode 2) is used. In the autonomous resource allocation method, a communication device performs sensing before transmitting a signal to determine a resource to be used. For example, a communication device detects a resource reserved by another communication device by continuously performing sensing for a specified period. In this method, however, the power consumption of the communication device is large. Therefore, in a case where periodic data transmission is performed in V2X communication, a method of performing sensing only at a specified timing corresponding to the period has been proposed. In addition, in the following description, the method of performing sensing only at the specified timing may be referred to as "partial sensing".

As described above, in order to reduce the power consumption of the communication device in V2X, partial sensing in which sensing is performed only at the timing corresponding to the specified period has been proposed. Then, the communication device can determine an available resource based on the partial sensing and transmit a signal by using the determined resource.

However, in NR-V2X, which supports new communication services, aperiodic traffic is expected to increase. In addition, in the conventional partial sensing, it is difficult to detect a resource reserved by the aperiodic traffic. That is, in a wireless communication system in which aperiodic traffic occurs, in the conventional partial sensing, packet collision may occur to reduce the reliability of V2X communication. Note that this problem may occur not only in V2X communication but also in arbitrary D2D (Device-to-Device) communication.

SUMMARY

According to an aspect of the embodiments, a communication device that supports D2D (Device-to-Device) communication includes: a processor configured to determine a sensing section for performing sensing based on a position of a first slot in a candidate selection slot set and information regarding a transmission of an aperiodic traffic, the sensing section being formed by a plurality of consecutive slots in a sensing window, the candidate selection slot set including a slot that is configured to transmit a D2D signal; and a sensing unit configured to perform sensing in the sensing section determined by the processor. The processor determines a resource for transmitting the D2D signal in the candidate selection slot set based on a result of the sensing by the sensing unit.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

BRIEF DESCRIPTION OF DRAWINGS

FIG. 10 illustrates a comparison result regarding the reduction of power consumption;

DESCRIPTION OF EMBODIMENTS

The issues and embodiments in this specification are examples, and do not limit the scope of rights of the patent application. For example, even if the expressions described are different, the techniques of the patent application can be applied as long as these are technically equivalent. In addition, the embodiments described in this specification can be combined to the extent that there is no contradiction.

As the terms and technical contents used in this specification, the terms and technical contents described in the specifications (for example, 3GPP TS 38.211 V16.0.0 (2019-12)) or the contributions as standards for communication, such as 3GPP, may be used.

Figure 1:
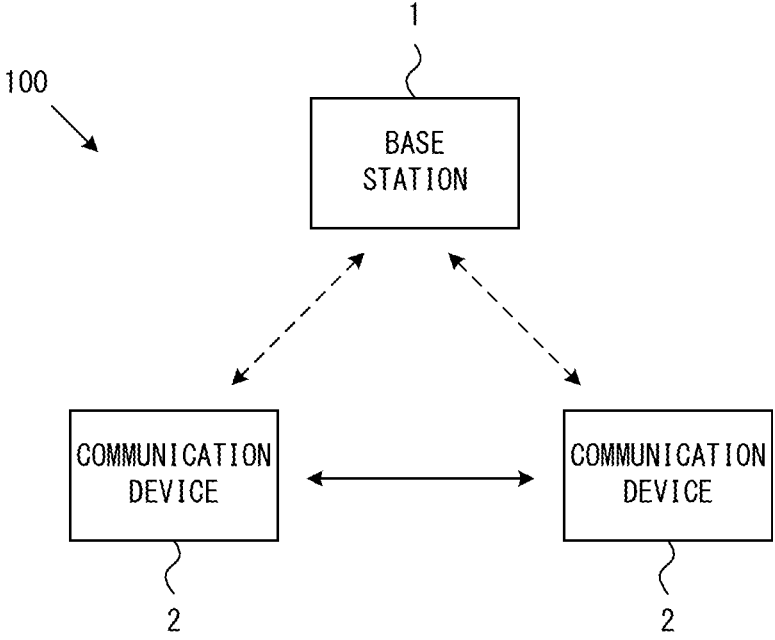
FIG. 1 illustrates an example of a wireless communication system according to an embodiment of the present disclosure.

FIG. 1 illustrates an example of a wireless communication system according to an embodiment of the present disclosure. As illustrated in FIG. 1, a wireless communication system 100 includes a base station 1 and a plurality of communication devices 2.

The base station 1 controls cellular communication (uplink/downlink communication through Uu interface) of each communication device 2. That is, the base station 1 receives an uplink signal (control signal and data signal) from the communication device 2. In addition, the base station 1 transmits a downlink signal (control signal and data signal) to the communication device 2.

The communication device 2 can communicate with another communication device through the base station 1. In addition, the communication device 2 can also communicate with another communication device without the base station 1. That is, the communication device 2 supports D2D (Device-to-Device) communication. In D2D communication, for example, a signal is transmitted through a PC5 interface. Note that D2D communication may be referred to as "sidelink communication". In addition, the communication device 2 may be referred to as "UE (User Equipment)".

When transmitting data by D2D communication, the communication device 2 determines a resource for transmitting the data. At this time, the communication device 2 detects a resource reserved by another communication device in resources (that is, a resource pool) configured in advance for D2D communication. Then, the communication device 2 transmits data by using a resource that is not reserved by another communication device. In the following description, the process of detecting a resource reserved by another communication device in the resource pool for D2D communication may be referred to as "sensing".

Figure 2:
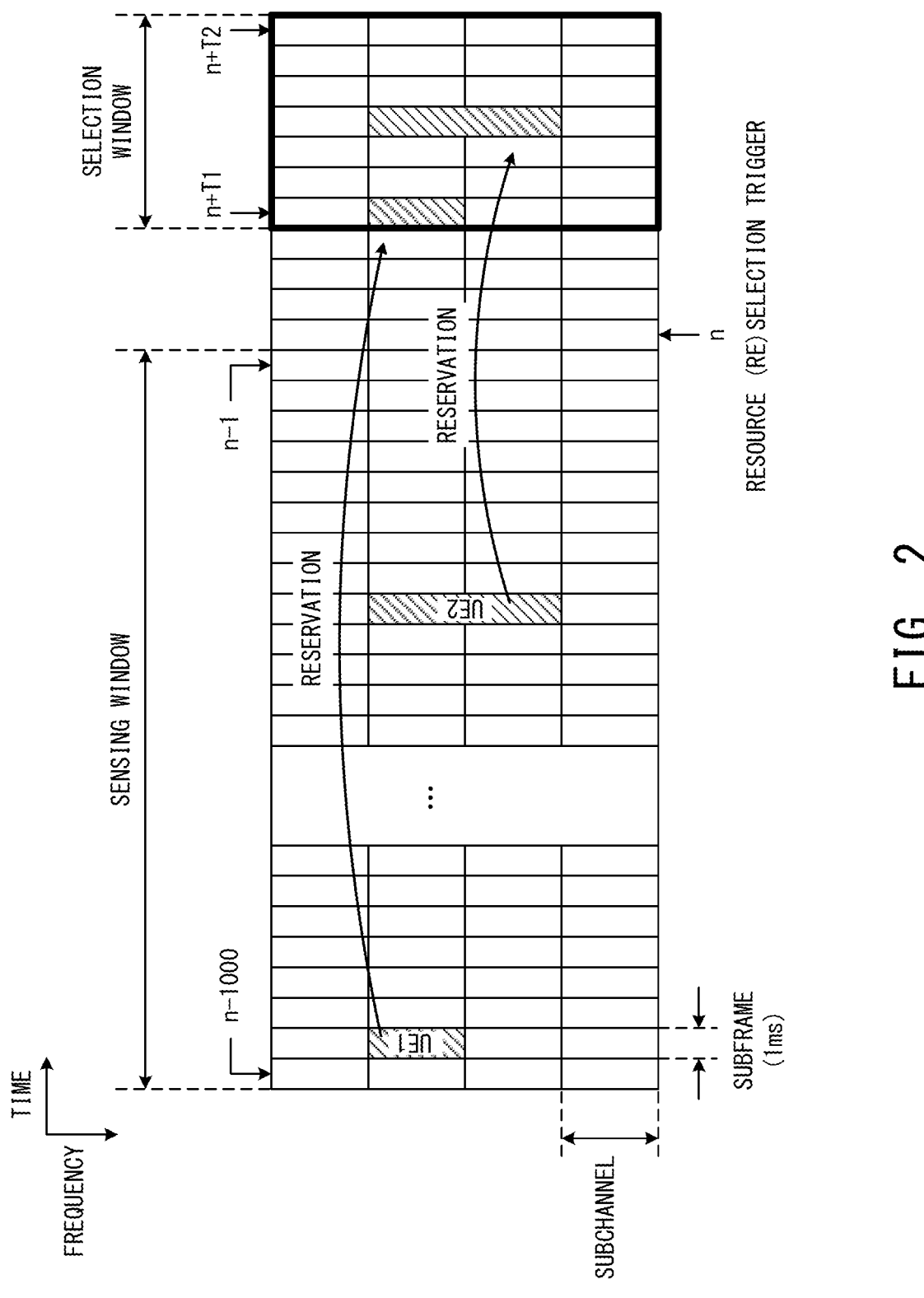
FIG. 2 illustrates an example of a method of determining a resource based on sensing.

FIG. 2 illustrates an example of a method of determining a resource based on sensing. Here, it is assumed that a resource (re)selection trigger is generated in a subframe n. The resource (re)selection trigger corresponds to, for example, an instruction to determine a resource for transmitting data generated by an application implemented in the communication device 2. In addition, it is assumed that the timing at which the resource (re)selection trigger is generated is predictable. That is, it is assumed that the communication device 2 can predict the timing at which the resource (re)selection trigger is generated.

The communication device 2 configures a selection window and a sensing window for the resource (re)selection trigger. The selection window indicates the range of resources that can be selected. That is, the communication device 2 can select a resource for transmitting data from the resources in the selection window. When the resource (re) selection trigger is generated in the subframe n, the range of the selection window is subframes "n+T1, n+T2". Note that "n+T1, n+T2" indicates a range from a subframe n+T1 to a subframe n+T2. The parameters T1 and T2 are determined in advance, for example. Alternatively, the parameters T1 and T2 are notified from the base station 1.

The sensing window indicates a range in which the communication device 2 performs sensing. That is, the communication device 2 performs sensing for each resource in the sensing window. Here, the communication device 2 performs sensing for, for example, 1000 subframes immediately before the resource (re)selection trigger. In this case, when it is predicted that a resource (re)selection trigger will be generated in the subframe n, the range of the sensing window is formed by subframes "n−1000, n−1".

In the sensing process, the communication device 2 decodes a PSCCH (Physical Sidelink Control Channel), which is a control channel transmitted in the sensing window and measures the received power of a PSSCH (Physical Sidelink Shared Channel), which is a corresponding data channel. For example, sidelink control information (SCI) including information regarding the reservation of transmission resources and resources of the corresponding data channel (PSSCH: Physical Sidelink Shared Channel) is mapped to the PSCCH resource. In the measurement of received power, for example, reference signal received power (RSRP) and/or received signal strength indicator (RSSI) is measured.

In addition, in NR-V2X, the control channel (PSCCH: Physical Sidelink Control Channel) and the data channel (PSSCH: Physical Sidelink Shared Channel) are multiplexed by TDM (Time Division Multiplexing) or FDM (Frequency Division Multiplexing). In addition, in order to improve the channel quality of the sidelink, a feedback channel (PSFCH: Physical Sidelink Feedback Channel) has been introduced.

In the example illustrated in FIG. 2, some of the resources in the selection window are reserved by other communication devices (UE1 and UE2). In this case, the communication device 2 excludes reserved resources, in which received power is higher than a threshold value determined in advance, from the resources in the selection window and determines a resource for transmitting the data among the remaining resources. Note that the sensing illustrated in FIG. 2 is described in Release 14 of 3GPP.

However, in the method illustrated in FIG. 2, since sensing is continuously performed over a long period of time, the power consumption of the communication device 2 increases. On the other hand, in many cases, the battery capacity of a communication device carried by a pedestrian is small. For this reason, there is a demand for a sensing method with low power consumption.

Figure 3:
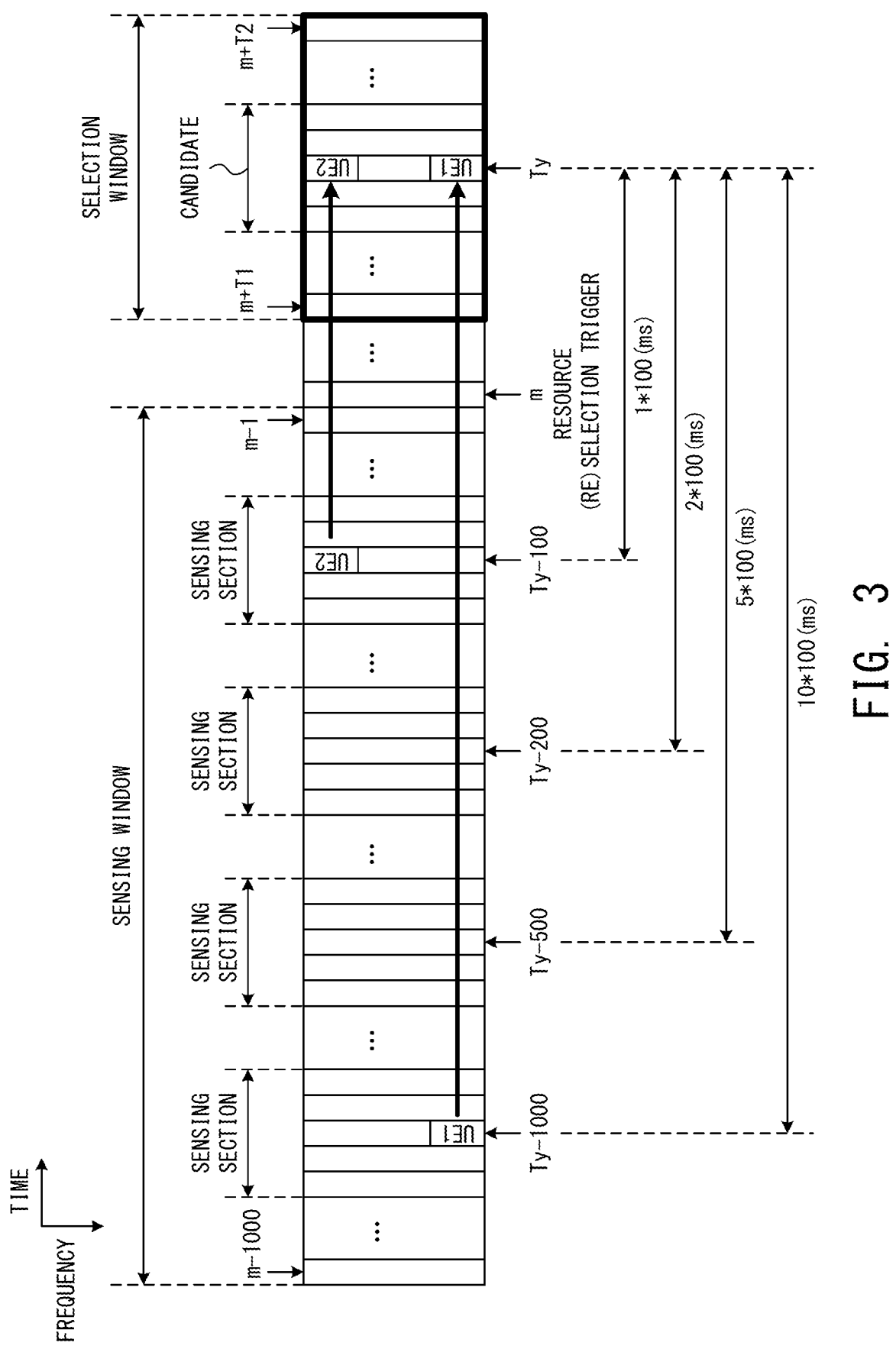
FIG. 3 illustrates another example of the method of determining a resource based on sensing.

FIG. 3 illustrates another example of the method of determining a resource based on sensing. Here, it is assumed that packets are transmitted at specified periods in D2D communication. Specifically, in D2D communication, packets are transmitted at intervals of k×100 msec. k is not particularly limited, but in this example, k is 1, 2, 5, or 10.

In this case as well, the communication device 2 configures a selection window and a sensing window corresponding to the resource (re)selection trigger, as in the case illustrated in FIG. 2. However, the communication device 2 configures a candidate selection subframe set in the selection window. In this example, the candidate selection subframe set includes Y consecutive subframes. In FIG. 3, Y=5, and the candidate selection subframe set includes five consecutive subframes. In addition, the "candidate" illustrated in FIG. 3 indicates a candidate selection subframe set.

Here, when a resource in the candidate selection subframe set is used by the periodic traffic of another communication device, the previous transmission should be performed at a time dating back k×100 msec from the candidate selection subframe set. Therefore, if sensing is performed on the resource k×100 msec before the candidate selection subframe set, the communication device 2 can determine whether or not the resource in the candidate selection subframe set is reserved by the periodic traffic of another communication device when the resource (re)selection trigger is generated.

Therefore, the communication device 2 configures a sensing section corresponding to the candidate selection subframe set in the sensing window. Specifically, as illustrated in FIG. 3, the sensing section is set k×100 msec before the candidate selection subframe set as a reference. The length of each sensing section is the same as the candidate selection subframe set. That is, each sensing section includes Y subframes.

When the resource (re)selection trigger is generated in a subframe m, the communication device 2 performs sensing in four sensing sections illustrated in FIG. 3. In this case, the communication device 2 receives control signals (for example, SCI) transmitted respectively from the UE 1 and the UE 2 and detects that the periodic traffic of the UE 1 and the UE 2 reserves specified resources in the candidate selection subframe set. In addition, the received power of the PSSCH corresponding to the control signal is measured. Then, the communication device 2 excludes resources, which are reserved by the UE1/UE2 and whose received power is higher than a threshold value determined in advance, from the resources in the candidate selection subframe set and determines a resource for transmitting the data among the remaining resources. Note that the sensing illustrated in FIG. 3 is also described in Release 14 of 3GPP.

As described above, according to the method illustrated in FIG. 3, since the sensing period is shorter than that in the method illustrated in FIG. 2, the power consumption of the communication device 2 is reduced. However, in NR-V2X, which supports new communication services, aperiodic traffic is expected to increase. However, in the method illustrated in FIG. 3, the communication device 2 cannot detect the resource reserved by the aperiodic traffic in the candidate selection subframe set. That is, in a wireless communication system in which aperiodic traffic occurs, a packet transmitted by the communication device 2 may collide with a packet of aperiodic traffic by another communication device to reduce the reliability of V2X communication.

As described above, in the D2D communication system, both the reduction of the power consumption of the communication device and the improvement of communication reliability are required. Specifically, a method of reducing power consumption as compared with the method illustrated in FIG. 2 and improving communication reliability as compared with the method illustrated in FIG. 3 is required.

EMBODIMENTS

As described above, in the method illustrated in FIG. 3, the reliability of communication may be reduced when aperiodic traffic occurs. Therefore, the reservation of resources relevant to aperiodic traffic in D2D communication will be briefly described.

Figure 4:
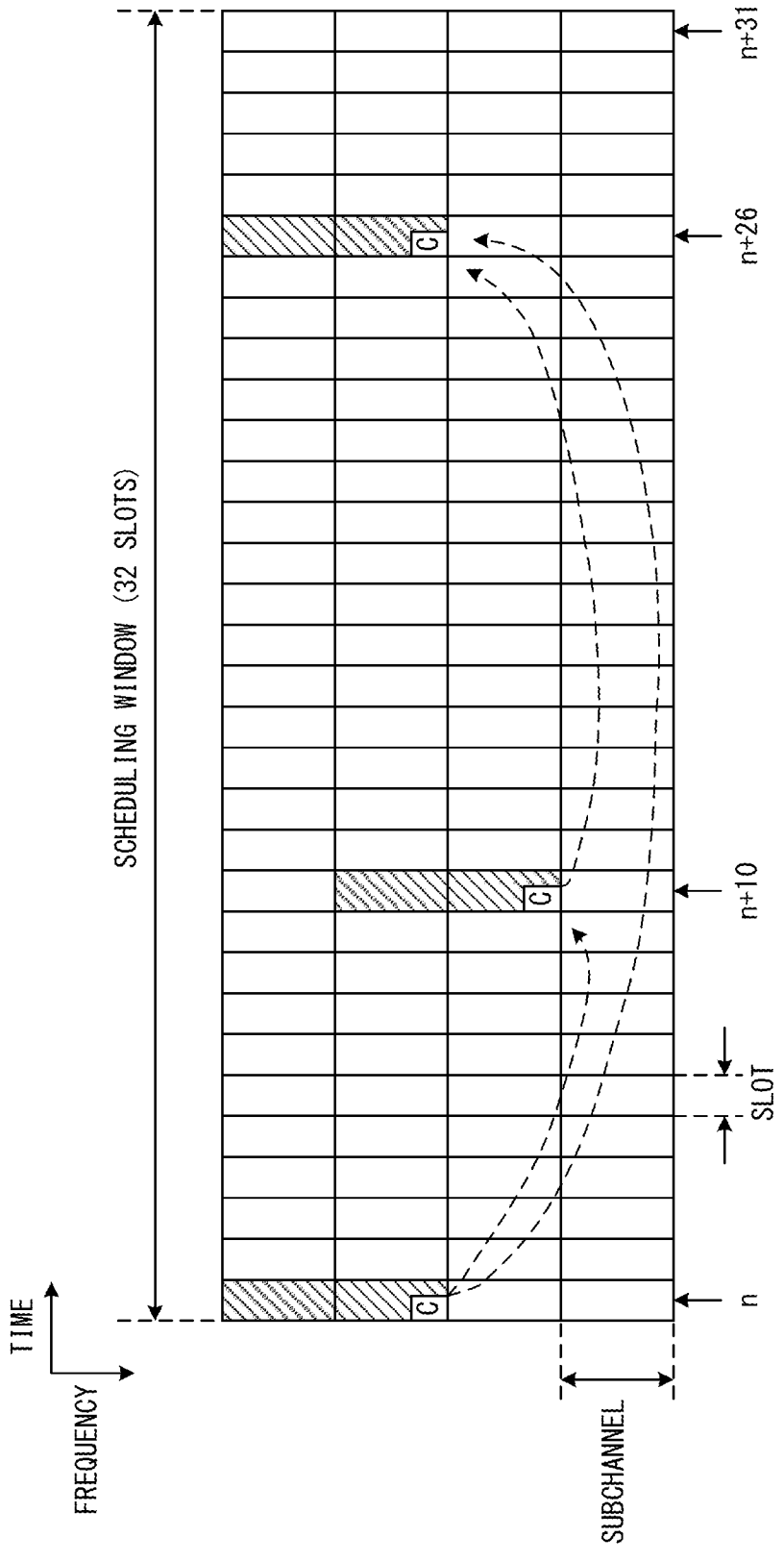
FIG. 4 illustrates an example of resource reservation for NR-V2X.

FIG. 4 illustrates an example of resource reservation for NR-V2X. In NR-V2X, retransmission sequence is supported. That is, when data is transmitted by using a certain resource, the communication device can reserve a resource for retransmitting the data. For example, as illustrated in FIG. 4, it is assumed that data is transmitted in a slot n. In this case, a scheduling window is configured with the slot n as a reference. In this example, the scheduling window is configured to include 32 slots. The communication device can reserve resources for retransmission in the scheduling window. The number of resources that can be reserved is 2 or 3 including the first transmission. Note that the scheduling window is an example of a range in which resources for corresponding retransmission can be reserved for the first transmission of D2D data.

In the example illustrated in FIG. 4, resources for retransmission are reserved in slots n+10 and n+26. In addition, the size of the resources reserved for retransmission is the same as that at the time of first transmission. However, resources for retransmission can be reserved at the desired time and frequency within the scheduling window.

Information regarding the reservation of resources for retransmission is included, for example, in the SCI. In FIG. 4, "C" indicates SCI. In this case, the information regarding the reservation of resources for retransmission is included in the SCI configured in the control channel of the first transmission. For example, when the first transmission is performed in the slot n, resources (n+10, n+26) for retransmission are reserved by the SCI configured in the control channel of the slot n. Alternatively, the retransmission resource (n+10) may be reserved by the SCI in the slot n, and the retransmission resource (n+26) may be reserved by the SCI in the slot n+10.

When the retransmission resource is reserved by using the scheduling window described above, the interval between the first transmission and the retransmission is at most 32 slots (that is, the width of the scheduling window). In other words, when a resource X is reserved for retransmission, the first transmission corresponding to the retransmission should be performed within the range of 32 slots or less before the resource X. Therefore, when resources in the candidate selection subframe set illustrated in FIG. 3 are reserved for retransmission, the first transmission should be performed within the range of 32 slots or less before the candidate selection subframe set. Therefore, the communication device 2 according to the embodiment of the present disclosure determines a section for sensing in consideration of such resource reservation for retransmission.

Figure 5:
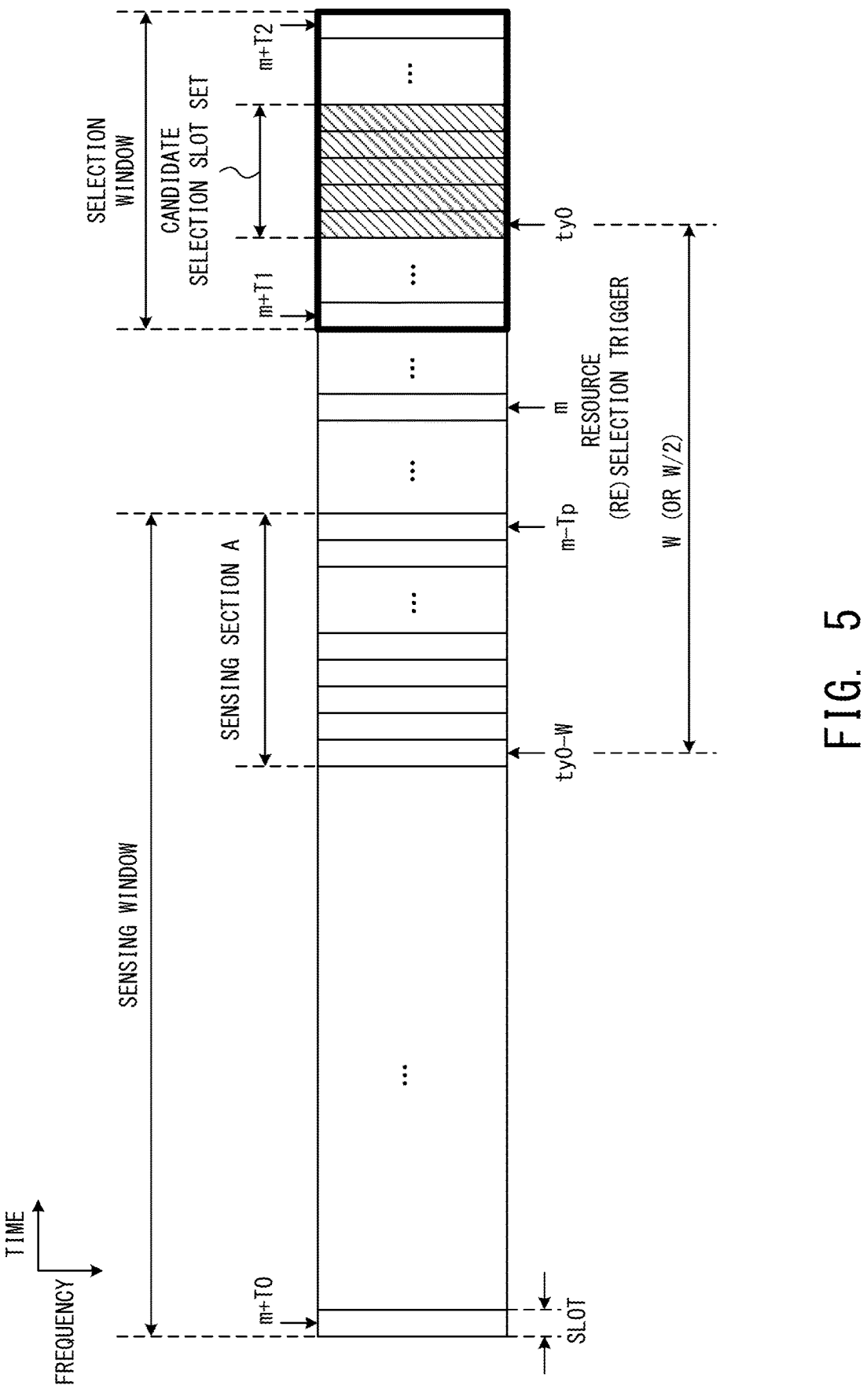
FIG. 5 illustrates an example of a sensing method according to an embodiment of the present disclosure.

FIG. 5 illustrates an example of a sensing method according to an embodiment of the present disclosure. In the present embodiment, it is assumed that communication is performed in a unit of slot. Assuming that the subframe length is Ls, the slot length is selected from among, for example, Ls, Ls/2, Ls/4, and Ls/8.

The communication device 2 configures a selection window and a sensing window corresponding to the resource (re)selection trigger, as in the case illustrated in FIG. 2 or FIG. 3. In addition, the communication device 2 configures a candidate selection slot set in the selection window, as in the case illustrated in FIG. 3.

When the resource (re)selection trigger is generated in a slot m, the range in which the selection window is configured is slots "m+T1, m+T2". Note that "m+T1, m+T2" indicates a range from a slot m+T1 to a slot m+T2. The parameters T1 and T2 are determined in advance, for example. Alternatively, the parameters T1 and T2 are notified from the base station 1. In the present embodiment, the candidate selection slot set includes Y consecutive slots in the selection window. Here, the candidate selection slot set can be configured at a desired position in the selection window. In addition, in the example illustrated in FIG. 5, Y=5, and the candidate selection slot set includes five consecutive slots. Note that the parameters T1, T2 and Y are examples of the information regarding a transmission of an aperiodic traffic.

When the resource (re)selection trigger is generated in the slot m, the range in which the sensing window is configured is slots "m−T0, m−Tp". T0 is not particularly limited, but is arbitrarily determined within the range of 100 msec to 1100 msec. Tp indicates the time required for processing relevant to sensing in the communication device 2. The time required for the processing relevant to sensing includes, for example, a process of calculating received power and a process of decoding a received signal to acquire the SCI. Here, when the time required for the processing relevant to sensing is sufficiently short with respect to the processing capability of the communication device 2, the range in which the sensing window is configured may be slots "m−T0, m−1". Note that the parameters T0 and Tp are determined in advance, for example. Alternatively, the parameters T0 and Tp are notified from the base station 1.

The communication device 2 configures a sensing section A in the sensing window. The sensing section A is determined based on the candidate selection slot set that is configured in the selection window. Specifically, the start position of the sensing section A is determined based on the position of the first slot in the candidate selection slot set.

Here, it is assumed that the first slot in the candidate selection slot set is ty0. In this case, the start slot of the sensing section A is "ty0−W" as illustrated in FIG. 5. That is, the start position of the sensing section A corresponds to a slot that goes back by the width W of the scheduling window with the first slot in the candidate selection slot set as a reference. On the other hand, the end slot of the sensing section A is "m−Tp". That is, the end position of the sensing section A corresponds to a slot that goes back by the time required for processing relevant to sensing with the slot in which the resource (re)selection trigger is generated as a reference. In this example, the end slot of the sensing section A matches the last slot of the sensing window. Note that the width Y is an example of the information regarding a transmission of an aperiodic traffic.

The communication device 2 performs sensing in the sensing section A described above. Then, the communication device 2 determines a resource (that is, a slot) for transmitting a D2D signal in the candidate selection slot set based on the sensing result. After that, the communication device 2 transmits data by using the determined resource.

Figure 6:
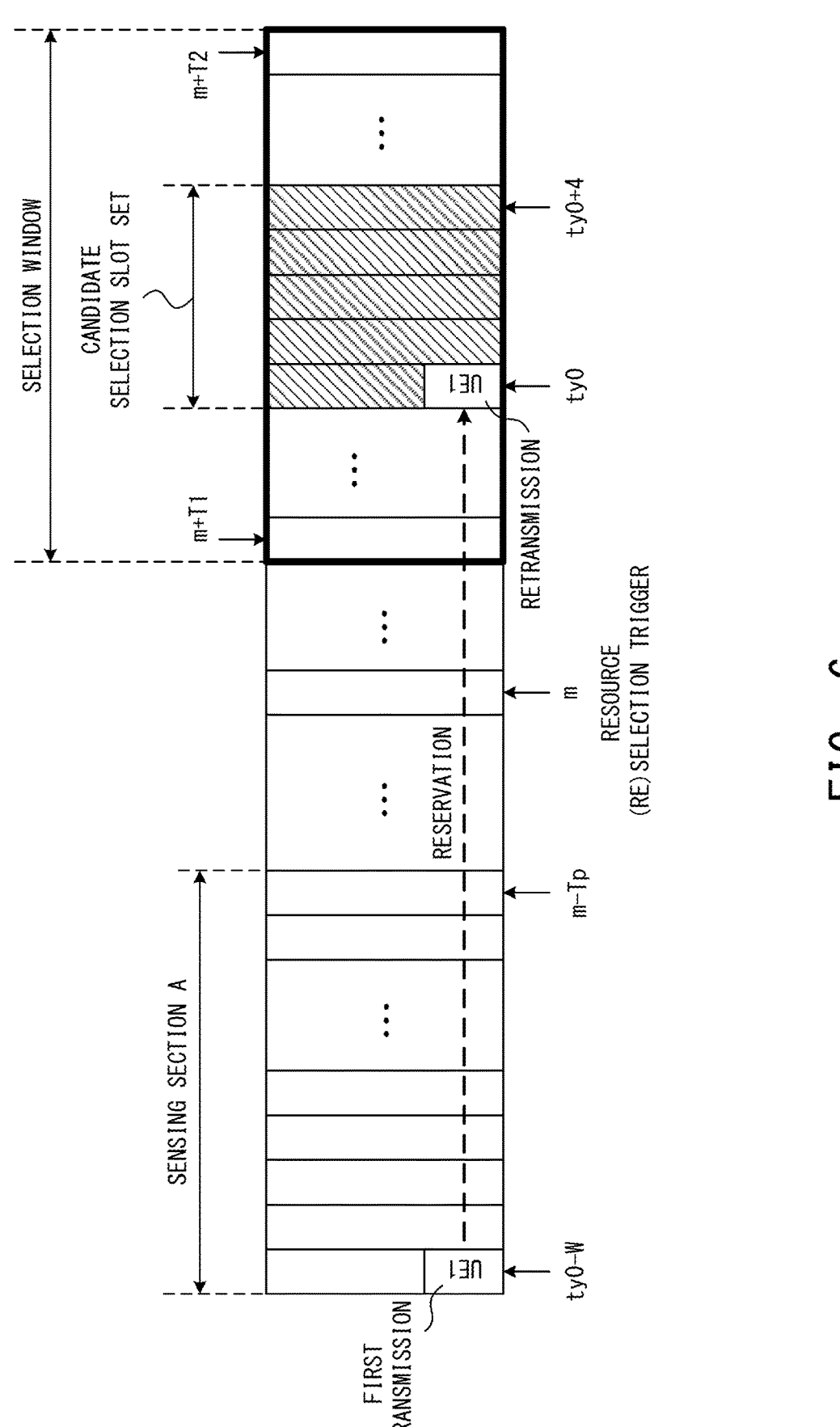
FIG. 6 illustrates an example of a method for detecting a reserved resource.

In the embodiment illustrated in FIG. 6, it is predicted that the resource (re)selection trigger will be generated in the slot m. In addition, the communication device 2 configures a candidate selection slot set in slots "ty0, ty0+4". In this case, the communication device 2 configures the sensing section A in slots "ty0−W, m−Tp". In addition, it is assumed that the communication device 2 predicts that the resource (re) selection trigger will be generated in the slot m prior to the slot ty0−W. Then, when it is predicted that the resource (re)selection trigger will be generated in the slot m, the communication device 2 performs sensing in the slots "ty0−W, m−Tp".

In the present embodiment, the UE 1 transmits a D2D signal in the slot ty0−W. Then, the communication device 2 acquires the SCI transmitted from the UE1 in the slot ty0−W by performing sensing on each resource in the sensing section A. It is assumed that the acquired SCI includes information relevant to resource reservation for retransmission. Here, the SCI indicates "reserving a resource for retransmission in slot ty0". In addition, the communication device 2 measures the RSRP of the PSCCH or the RSRP of the corresponding PSSCH transmitted from the UE1. When the measured value is higher than a specified threshold value, the communication device 2 excludes the resource reserved by the UE1 from the resources in the candidate selection slot set. Then, the communication device 2 determines a resource for transmitting data among the resources remaining in the candidate selection slot set.

Here, the resource for retransmission is reserved in the scheduling window, as described above with reference to FIG. 4. In addition, the start slot of the sensing section A is located ahead of the first slot of the candidate selection slot set by the width W of the scheduling window. Therefore, when the resource in the candidate selection slot set is reserved for retransmission of D2D communication, the first transmission corresponding to the retransmission is likely to be performed in the sensing section A. That is, when a resource for retransmission is reserved in the candidate selection slot set, there is a high possibility that the first transmission corresponding to the retransmission will be detected by performing sensing in the sensing section A. Then, the communication device 2 can specify the resource reserved for retransmission in the candidate selection slot set by acquiring the SCI of the first transmission. Therefore, the communication device 2 can determine a resource for transmitting the D2D signal so as not to cause a collision with a packet transmitted from another communication device.

In the example illustrated in FIG. 6, the resource for retransmission is reserved in the first slot in the candidate selection slot set. In this case, even when a resource of another slot in the candidate selection slot set is reserved, there is a high possibility that the corresponding first transmission will be performed within the sensing section A. For example, when a resource for the retransmission signal is reserved in the fifth slot (that is, ty0+4) in the candidate selection slot set, the corresponding first transmission is the slot "ty0+4−W" even in the earliest case. Therefore, the communication device 2 can specify the reserved resource in the candidate selection slot set by performing sensing in the sensing section A.

The communication device 2 configures the sensing section A when the conditions expressed by the following Equation are satisfied.

$$ty0-W \leq m-Tp \qquad \text{Condition}$$

When this condition is satisfied, the sensing section A including slots "ty0−W", "ty0−W+1", . . . , "m−Tp" is configured.

In order to reduce power consumption, it is preferable that the communication device 2 waits in a sleep mode in a period in which sensing is not performed. In the sleep mode, the communication device 2 does not perform sensing. That is, in the sleep mode, the communication device 2 does not perform a process of decoding the received signal and a process of measuring the received power. Then, when the sensing section A is configured according to the resource (re)selection trigger, the communication device 2 switches the operation mode from the sleep mode to the sensing mode immediately before the sensing section A. That is, the communication device 2 performs sensing from the slot "ty0−W" to the slot "m−Tp".

In the embodiment described above, the start slot of the sensing section A is determined by shifting the first slot of the candidate selection slot set by the width W of the scheduling window. However, the present disclosure is not limited to this configuration. For example, the start slot of the sensing section A may be determined by shifting the first slot of the candidate selection slot set by half (that is, W/2) the width of the scheduling window.

In the embodiment described above, the candidate selection slot set includes Y consecutive slots, but the present disclosure is not limited to this configuration. That is, the candidate selection slot set may include a plurality of non-consecutive slots. For example, in the example illustrated in FIG. 7, the candidate selection slot set includes four non-consecutive slots. Even in this case, however, the start slot of the sensing section A is determined by shifting the first slot (that is, ty0) of the candidate selection slot set by the width W of the scheduling window.

Figure 7:
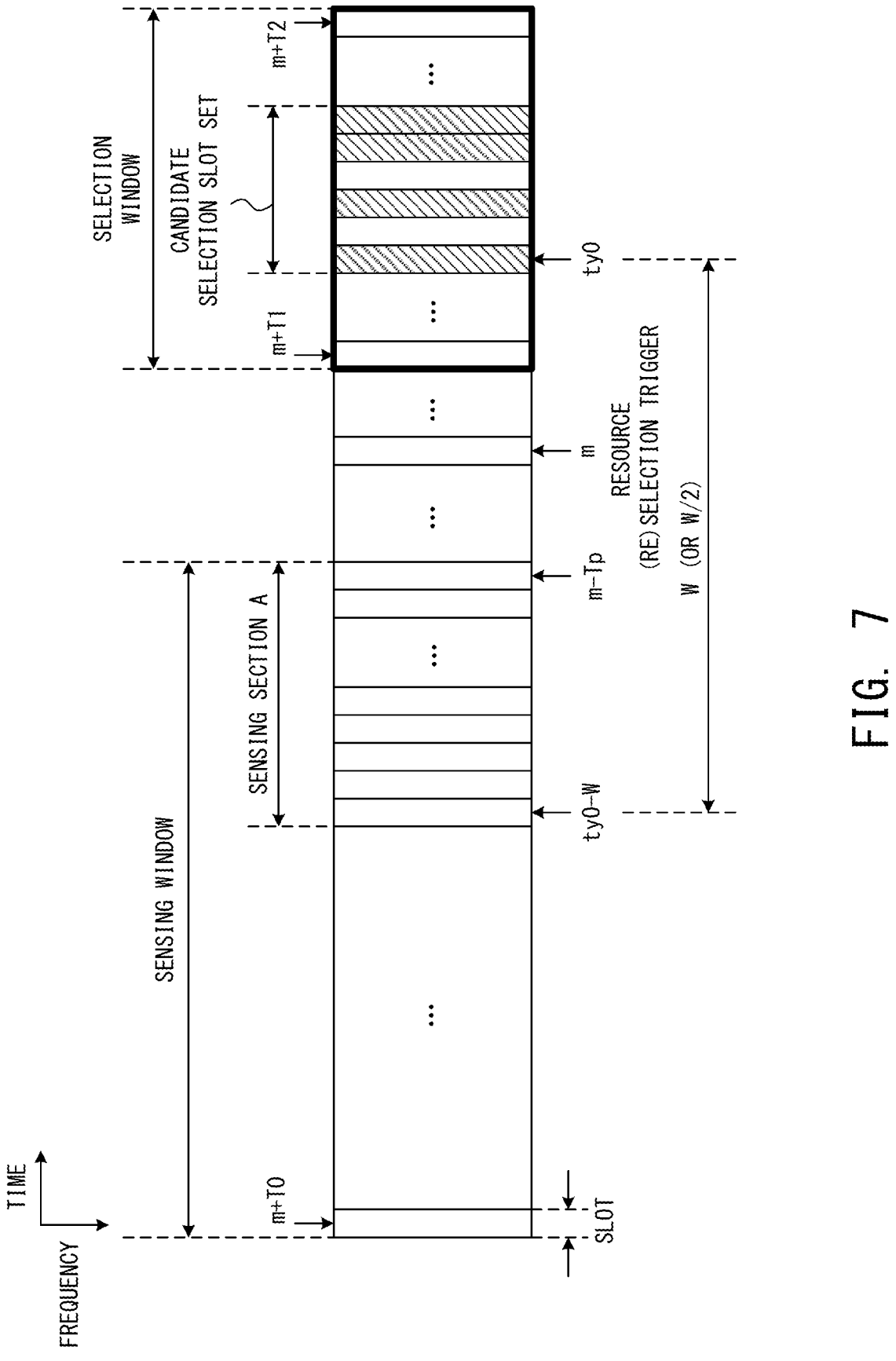
FIG. 7 illustrates an example of a candidate selection slot set including non-consecutive slots.

In the methods illustrated in FIGS. 5-7, a resource reservation for retransmission of aperiodic traffic is mainly detected. On the other hand, in the method illustrated in FIG.

3, the resource reservation of the periodic traffic is mainly detected. Therefore, by combining these methods, resource reservations of both periodic traffic and aperiodic traffic can be detected.

Figure 8:
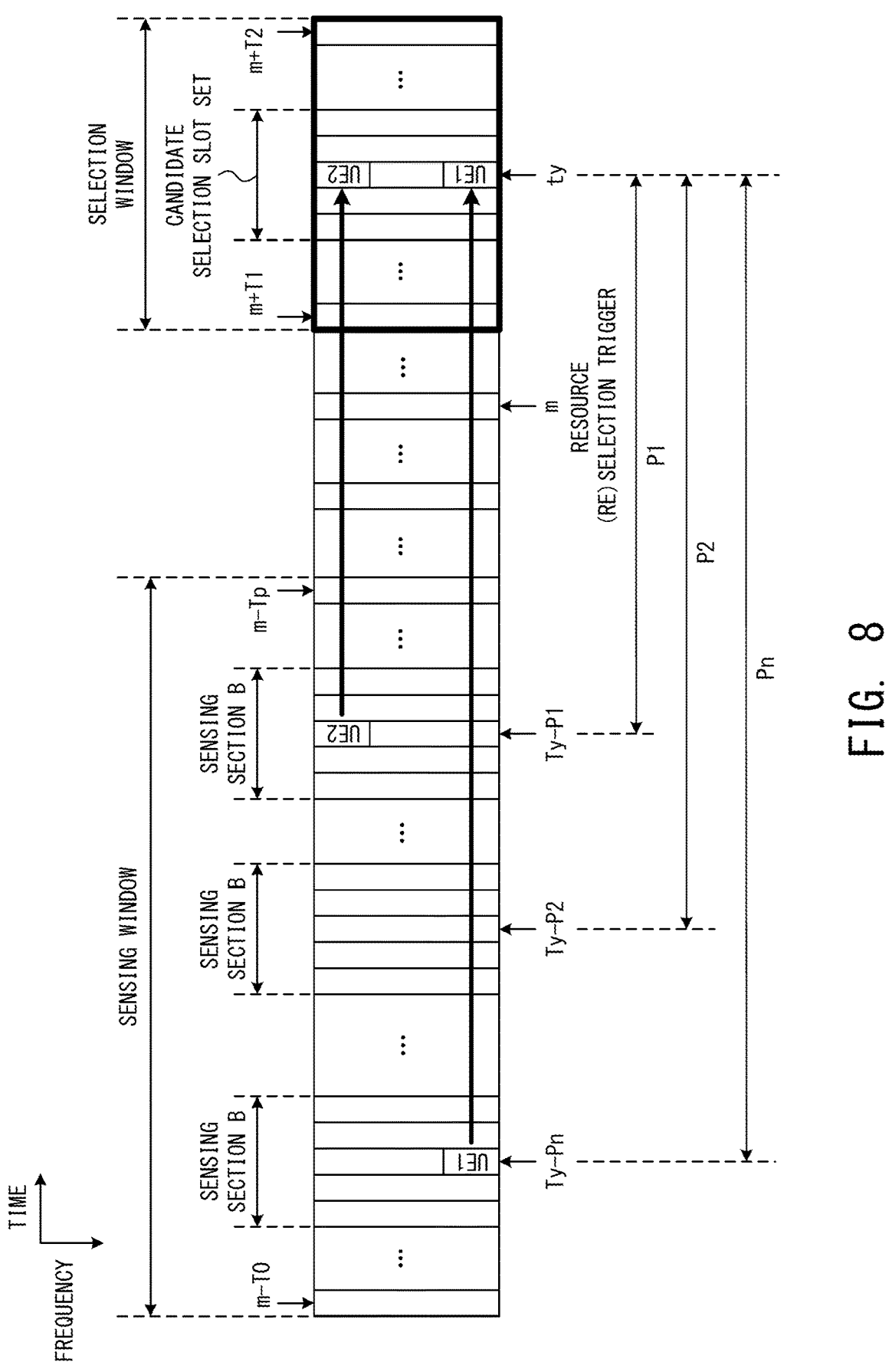
FIG. 8 illustrates an example of partial sensing for detecting the reservation of periodic traffic.

In this case, the resource reservation of the periodic traffic is detected by using, for example, a sensing section B illustrated in FIG. 8. The configuration of a sensing section is substantially the same in FIGS. 3 and 8. However, in the method illustrated in FIG. 8, the sensing section B is configured in a unit of slot. When the resource (re)selection trigger is generated in the slot m, the range of the sensing window is "m−T0, m−Tp". The period of the detection target is P1, P2, . . . , Pn. In this case, for the position of each sensing section B, it is determined to respectively shift the candidate selection slot set by P1, P2, . . . , Pn.

Figure 9:
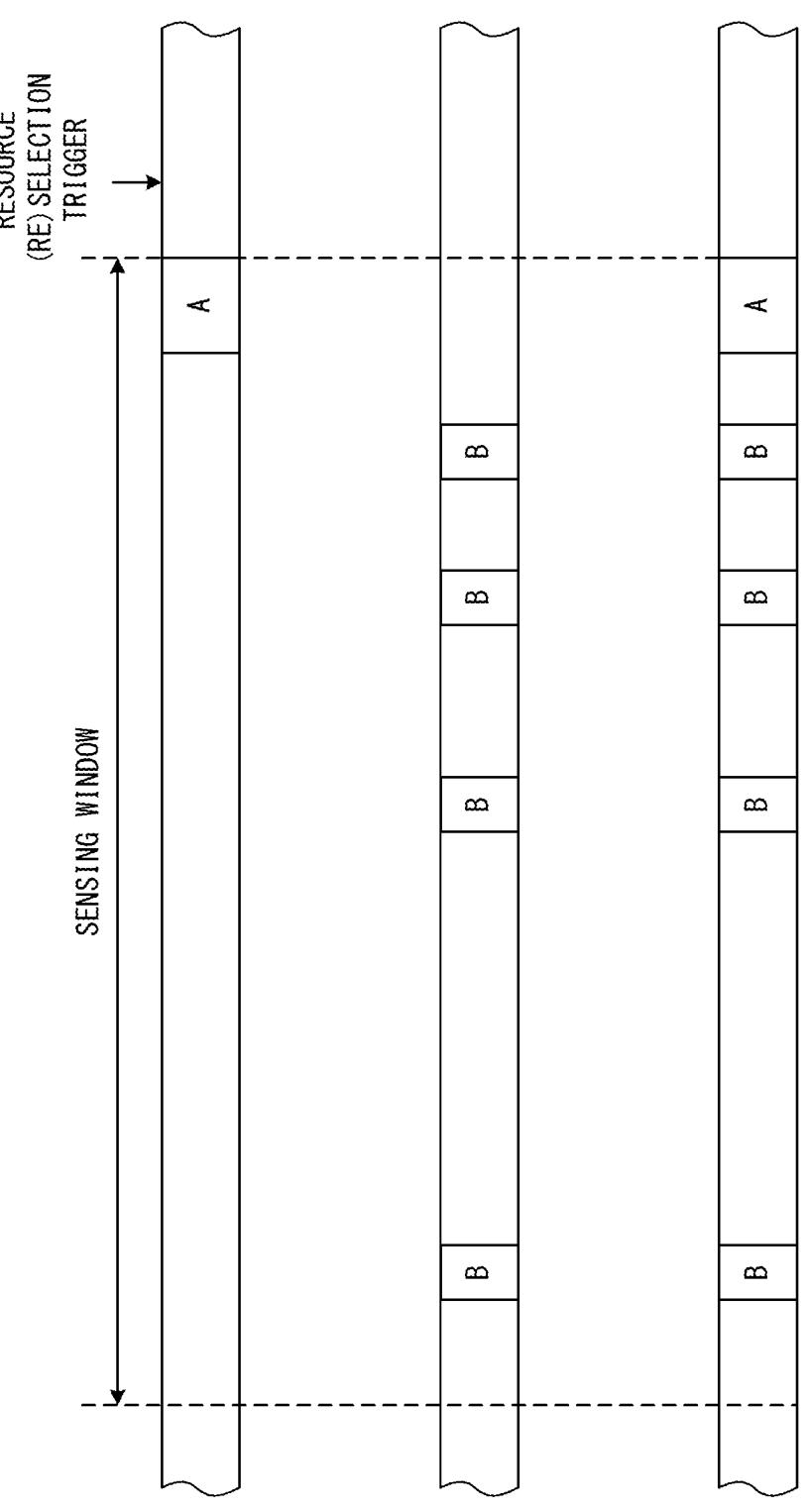
FIG. 9 illustrates an example of a sensing section.

For example, as illustrated in FIG. 9, the communication device 2 configures the sensing section A for the resource (re)selection trigger in order to detect a resource reservation for retransmission of aperiodic traffic. In addition, the communication device 2 configures one or more sensing sections B for the resource (re)selection trigger in order to detect the resource reservation of the periodic traffic. That is, the communication device 2 configures the sensing section A and the sensing section B for the resource (re)selection trigger. Then, the communication device 2 performs sensing in the sensing section A and the sensing section B to detect a resource reserved by another D2D communication in the candidate selection slot set.

FIG. 10 illustrates a comparison result regarding the reduction of power consumption. As illustrated in FIG. 2, full range sensing is to perform sensing on all resources in the sensing window. The width of the sensing window is 1000 subframes. As illustrated in FIG. 3 or FIG. 8, partial sensing is to perform sensing in one or more sensing sections (B). It is assumed that the number of sensing sections configured in the sensing window is 4, and the width of each sensing section is 5 subframes/slot. In this case, the number of subframes/slots belonging to the sensing section (B) is 20.

In the method of the embodiment, as illustrated in FIG. 5, sensing is performed in the sensing section A. Here, it is assumed that the width of the sensing section A is maximized. That is, the first slot in the candidate selection slot set is a slot next to a slot in which the resource (re)selection trigger is generated. In addition, the time Tp required for the sensing process is one slot time or less. In this case, the start slot of the sensing section A is "m+1−W", and the end slot of the sensing section A is "m−1". Therefore, when the width W of the scheduling window illustrated in FIG. 4 is 32 slots, the number of slots belonging to the sensing section A is 30.

In addition, for the sake of simplifying the investigation, the width of the slot is the same as the width of the subframe, which is 1 msec. In addition, the parameter T0 illustrated in FIGS. 5, 7, and 8 is 1000 msec.

In the full range sensing, sensing is performed in 1000 subframes. On the other hand, in the partial sensing, sensing is performed in 20 subframes/slots. Therefore, the power consumption of the partial sensing is reduced by 98% of the power consumption of the full range sensing. In the method of the embodiment, sensing is performed in 30 slots. Therefore, the power consumption in the method of the embodiment is reduced by 97% of the power consumption of the full range sensing. When the partial sensing and the method of the embodiment are combined, sensing is performed in 50 slots. Therefore, the power consumption when the two methods are combined is reduced by 95% of the power consumption of the full range sensing.

As described above, the power consumption in the method of the embodiment is greatly reduced as compared with the power consumption of the full range sensing. In addition, the power consumption in the method of the embodiment (and in a case where the two methods are combined) is almost the same as the power consumption of the partial sensing. On the other hand, in the method of the embodiment, since it is possible to detect the resource reservation for the retransmission of the aperiodic traffic illustrated in FIG. 4, packet collision is reduced as compared with the partial sensing.

Figure 11:
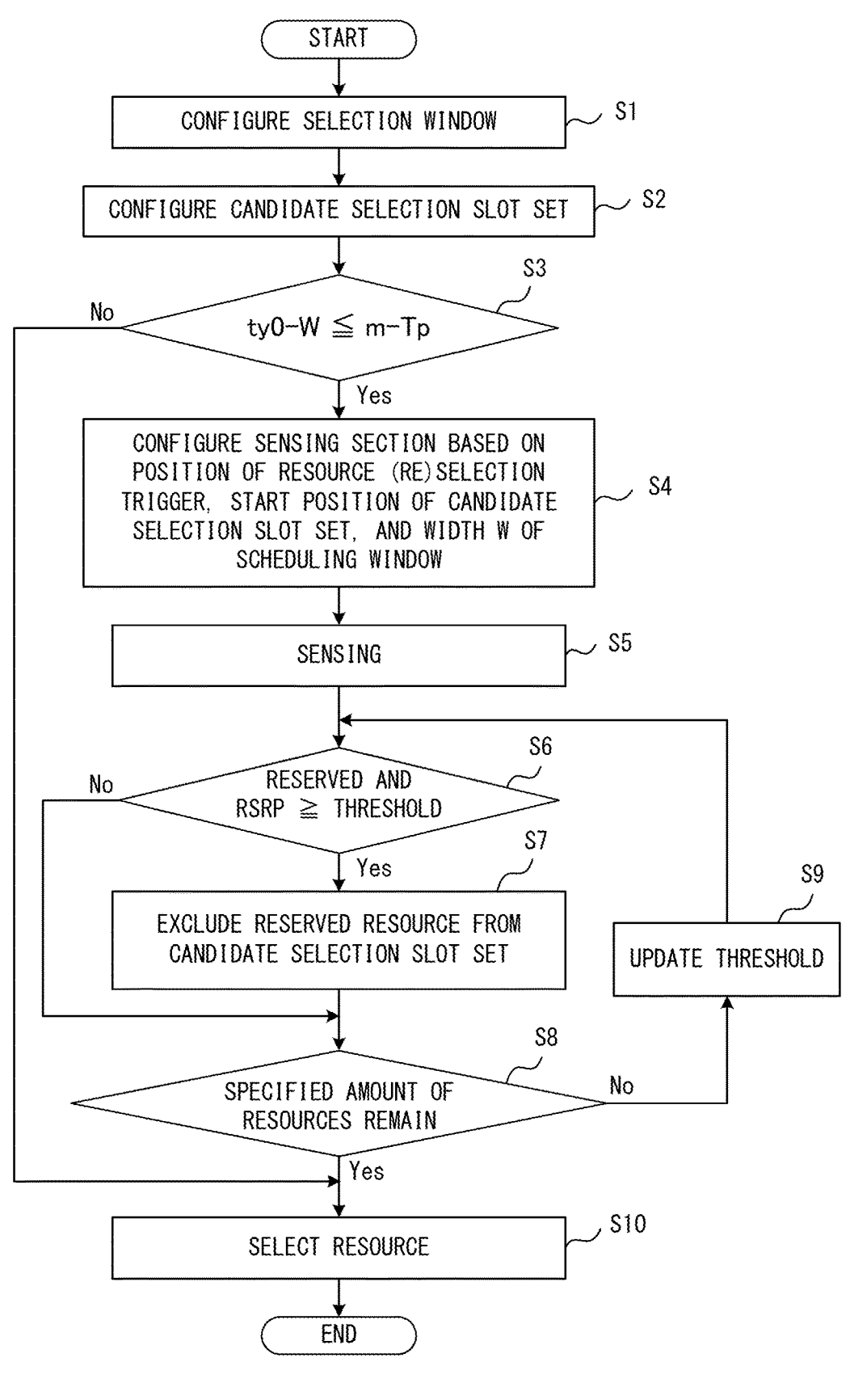
FIG. 11 is a flowchart illustrating an example of a communication method according to an embodiment of the present disclosure.

FIG. 11 is a flowchart illustrating an example of a communication method according to an embodiment of the present disclosure. The process of the flowchart is performed when the generation of a resource (re)selection trigger is predicted by the communication device 2.

In step S1, the communication device 2 configures a selection window corresponding to the resource (re)selection trigger. Parameters (T1, T2, and the like in FIG. 5) for configuring the selection window are determined in advance or notified from the base station 1.

In step S2, the communication device 2 configures a candidate selection slot set in the selection window. Parameters (for example, the number and arrangement of slots) for configuring the candidate selection slot set are determined in advance or notified from the base station 1. For example, in the example illustrated in FIG. 5, the number of slots is 5, and the slots are consecutive slots. In the example illustrated in FIG. 7, the number of slots is 4, and the slots are not consecutive slots.

In step S3, the communication device 2 determines whether or not the conditions "ty0−W≤m−Tp" are satisfied. ty0 indicates the position of the first slot in the candidate selection slot set. W indicates the width of the scheduling window for reserving the resource for retransmission of aperiodic traffic. m indicates a slot in which the resource (re)selection trigger is generated. Tp indicates the time required for the sensing process. Then, when the conditions are satisfied, the process of the communication device 2 proceeds to step S4, and when the conditions are not satisfied, the process of the communication device 2 proceeds to step S10.

In step S4, the communication device 2 configures the sensing section A based on the position m of the resource (re)selection trigger, the start position ty0 of the candidate selection slot set, and the width W of the scheduling window. The start position of the sensing section A is a slot that goes back by the width W from the start position ty0 of the candidate selection slot set. The end position of the sensing section A is a slot that goes back by the processing time Tp from a resource (re)selection trigger m. However, the end position of the sensing section A may be a slot immediately before the resource (re)selection trigger m.

In step S5, the communication device 2 performs sensing in the sensing section A. Specifically, for each resource in the sensing section A, control information (for example, SCI) is decoded, and the received power (for example, RSRP of PSCCH or RSRP or RSSI of PSSCH) is calculated. The result of sensing is stored in a memory.

In steps S6-S7, the communication device 2 extracts a resource, which is reserved by another communication device and whose received power is larger than the threshold value, based on the sensing result. The initial value of the threshold is determined in advance or notified from the base station 1. In addition, when a resource for D2D communication is reserved, the communication device (here, a communication device Z) notifies surrounding devices of the content of the reservation by using the SCI. At this time, this notification reaches each communication device located in the vicinity of the communication device Z. Therefore, the communication device 2 can detect the reservation of the resource by sensing. Then, the communication device 2 excludes the resource extracted, based on the reservation and the received power, from the resources in the candidate selection slot set.

In step S8, the communication device 2 determines whether or not a specified amount or more of resources remain in the candidate selection slot set. The specified amount is, for example, 20 percent of the total amount of resources in the initial state of the candidate selection slot set. Then, when the amount of remaining resources is less than the specified amount, the communication device 2 increases the threshold value in step S9. At this time, the threshold value is incremented by, for example, 3 dB. Thereafter, the process of the communication device 2 returns to step S6. That is, the processes of steps S6-S9 are repeatedly performed until the amount of resources remaining in the candidate selection slot set becomes equal to or greater than the specified amount. Then, when the amount of resources remaining in the candidate selection slot set becomes equal to or greater than the specified amount, the process of the communication device 2 proceeds to step S10.

In step S10, the communication device 2 selects a resource for transmitting data from the resources remaining in the candidate selection slot set. Then, the communication device 2 transmits data by using the selected resource.

Note that the processes of steps S1-S9 are performed, for example, before the resource (re)selection trigger is generated. In this case, the timing at which the resource (re) selection trigger is generated is predicted, and the processes of steps S1-S9 are performed based on the prediction. In addition, when the communication device 2 periodically transmits a signal, the communication device 2 can easily predict the timing at which the next resource (re)selection trigger is generated. For example, the communication device 2 continues periodic transmission with the same frequency resource until the counter expires based on a reselection counter randomly set within a certain range (for example, 5 to 15 times). In this case, the timing at which the counter expires is a timing at which the resource reselection trigger is generated, and can be easily predicted.

In addition, the communication device 2 may perform the processes of steps S1-S9 when the resource (re)selection trigger is generated. In this case, however, the communication device 2 always stores a signal indicating the state of the radio wave in the memory. Then, when the resource (re) selection trigger is generated, the processes of steps S1-S9 are performed by using the signal stored in the memory.

Figure 12:
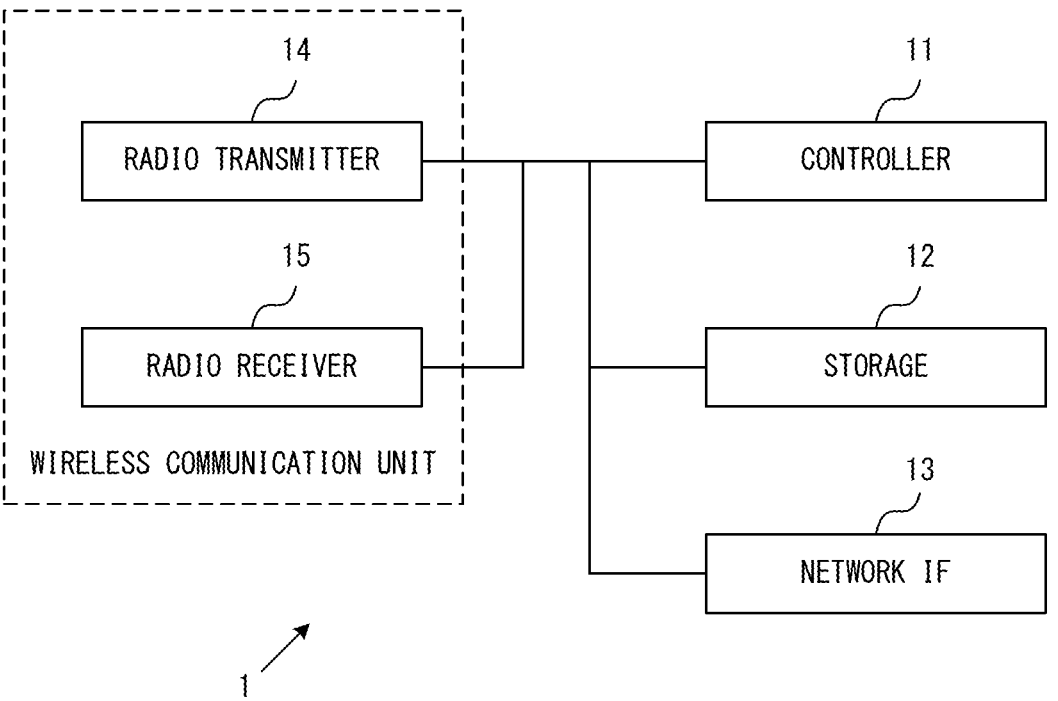
FIG. 12 illustrates an example of the configuration of a base station.

FIG. 12 illustrates an example of the configuration of the base station 1. The base station 1 is, for example, a next generation base station device (gNB: Next generation NodeB). As illustrated in FIG. 12, the base station 1 includes a controller 11, a storage 12, a network interface 13, a radio transmitter 14, and a radio receiver 15. Note that the base station 1 may have other circuits or functions not illustrated in FIG. 12.

The controller 11 controls cellular communication provided by the base station 1. In addition, the controller 11 may determine parameters for D2D communication (that is, sidelink communication) performed by the communication device 2. For example, the controller 11 may determine the parameters T1 and T2 indicating the arrangement of the selection window illustrated in FIG. 5, the parameter Y indicating the number of slots in the candidate selection slot set, the parameter W indicating the size of the scheduling window, and the like. In this case, the communication device 2 is notified of the determined parameters by, for example, PDCCH (Physical Downlink Control Channel) or RRC (Radio Resource Control). Note that, in the present embodiment, the controller 11 may be realized by a processor. However, some of the functions of the controller 11 may be realized by hardware circuits.

A software program executed by the processor is stored in the storage 12. In addition, data and information necessary for controlling the operation of the base station 1 are stored in the storage 12. The storage 12 is realized by, for example, a semiconductor memory. The network interface 13 provides an interface for connecting to the core network. That is, the base station 1 can be connected to another base station 1 or a network management system for controlling the base station 1 through the network interface 13.

The radio transmitter 14 transmits a radio signal for cellular communication according to an instruction given from the controller 11. That is, the radio transmitter 14 transmits a downlink signal to the communication device 2 located in the cell. The radio receiver 15 receives a radio signal for cellular communication according to an instruction given from the controller 11. That is, the radio receiver 15 receives an uplink signal transmitted from the communication device 2 located in the cell. The cellular communication is provided by using, for example, the 2.4 GHz band and/or the 4 GHz band.

Figure 13:
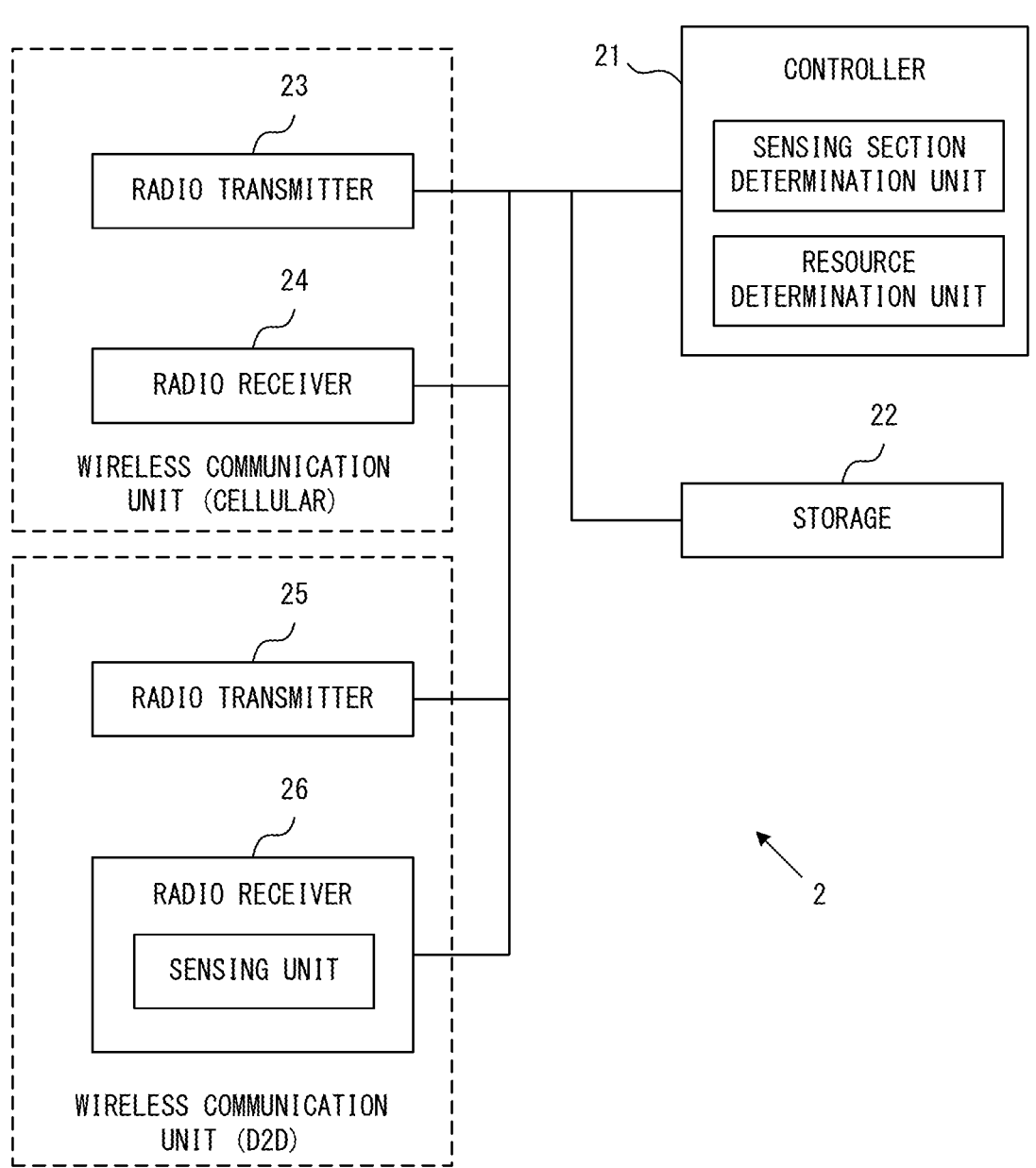
FIG. 13 illustrates an example of the configuration of a communication device.

FIG. 13 illustrates an example of the configuration of the communication device 2. The communication device 2 supports cellular communication and D2D communication. The D2D communication is realized by using a frequency band different from that of the cellular communication. For example, the D2D communication is provided by using the 6 GHz band. However, the D2D communication may share the same frequency band as the uplink of the cellular communication. The communication device 2 includes a controller 21, a storage 22, a radio transmitter 23, a radio receiver 24, a radio transmitter 25, and a radio receiver 26. Note that the communication device 2 may have other circuits or functions not illustrated in FIG. 13.

The controller 21 controls the cellular communication and the D2D communication provided by the communication device 2. In the present embodiment, the controller 21 is realized by a processor. In this case, the controller 21 has a function of controlling cellular communication and D2D communication by executing a software program stored in the storage 22. For example, the controller 21 executes a program describing the process of the flowchart illustrated in FIG. 11. In this case, the controller 21 performs the process of the flowchart illustrated in FIG. 11 in response to the resource (re)selection trigger given to the communication device 2. In addition, the controller 21 has a function of a sensing section determination unit that determines a sensing section and a function of a resource determination unit that determines a resource for transmitting a D2D signal in the candidate selection slot set. Some of the functions of the controller 21 may be realized by hardware circuits.

A software program executed by the processor is stored in the storage 22. In addition, data and information necessary for controlling the operation of the communication device 2 are stored in the storage 22. The storage 22 is realized by, for example, a semiconductor memory.

The radio transmitter 23 transmits a radio signal for cellular communication according to an instruction given from the controller 21. That is, the radio transmitter 23 transmits an uplink signal to the base station 1. The radio receiver 24 receives a radio signal for cellular communication according to an instruction given from the controller 21. That is, the radio receiver 24 receives a downlink signal transmitted from the base station 1. At this time, the radio receiver 24 may receive parameters relevant to sensing from the base station 1. That is to say, the radio receiver 24 may receive information regarding a transmission of an aperiodic traffic.

The radio transmitter 25 transmits a radio signal for D2D communication according to an instruction given from the controller 21. That is, the radio transmitter 25 transmits a D2D signal to another communication device by using the resource selected by the communication device 2 itself. The radio receiver 26 receives a radio signal for D2D communication according to an instruction given from the controller 21. That is, the radio receiver 26 receives a D2D signal transmitted from another communication device. In the present embodiment, the D2D signal includes V2X data and V2X control information. In addition, the sensing process of step S5 illustrated in FIG. 11 is performed by the radio receiver 26. That is, the radio receiver 26 includes a sensing unit that performs sensing in the sensing section. In this case, the radio receiver 26 may include a processor that performs the sensing process.

In the example illustrated in FIG. 13, the wireless communication unit for cellular communication and the wireless communication unit for D2D communication are provided separately from each other, but the communication device 2 is not limited to this configuration. For example, the wireless communication unit for cellular communication and the wireless communication unit for D2D communication may be shared. In this case, the radio transmitter 25 and the radio receiver 26 are not necessary. Then, the radio transmitter 23 transmits a cellular signal and a D2D signal, and the radio receiver 24 receives the cellular signal and the D2D signal. In addition, the radio receiver 24 includes a sensing unit.

Variations

In Release 16 NR-V2X, priority can be set for the reservation of D2D communication. For example, in a case illustrated in FIG. 14, the communication device 2 performs sensing in the sensing section A and selects resource R1 in a slot ty0+2 in the candidate selection slot set. After that, the resource R1 or a part of the resource R1 is reserved in duplicate by another communication device having a higher priority.

Figure 14:
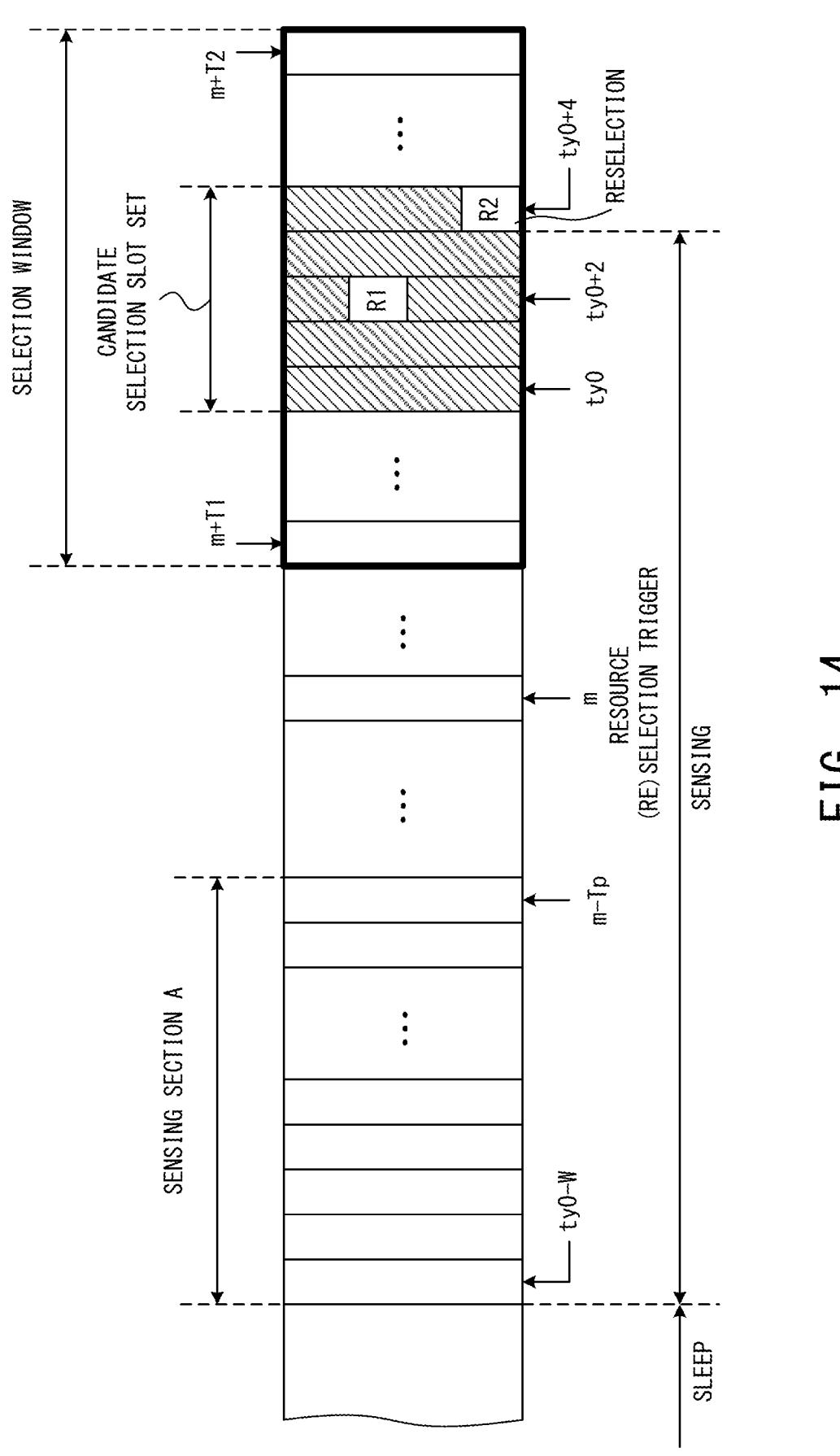
FIG. 14 illustrates an example of resource reselection.

In this case, the communication device 2 cannot use the resource R1. Therefore, when the communication device 2 detects that the resource R1 is reserved by another communication device having a higher priority, the communication device 2 releases the resource R1 and selects another resource from the candidate selection slot set. In FIG. 14, resource R2 is reselected in a slot ty0+4. Then, the communication device 2 transmits a D2D signal by using the reselected resource R2.

However, in order to detect a reservation made by another communication device having a higher priority, the communication device 2 needs to continue the sensing operation even after the end of the sensing section A. Specifically, the communication device 2 needs to continue the sensing operation until the period in which the D2D signal may be transmitted ends. Therefore, it is preferable that the communication device 2 continues the sensing operation until the end of the candidate selection slot set. In addition, the communication device 2 may determine whether or not to perform the above-described reselection for each resource pool.

Figure 15:
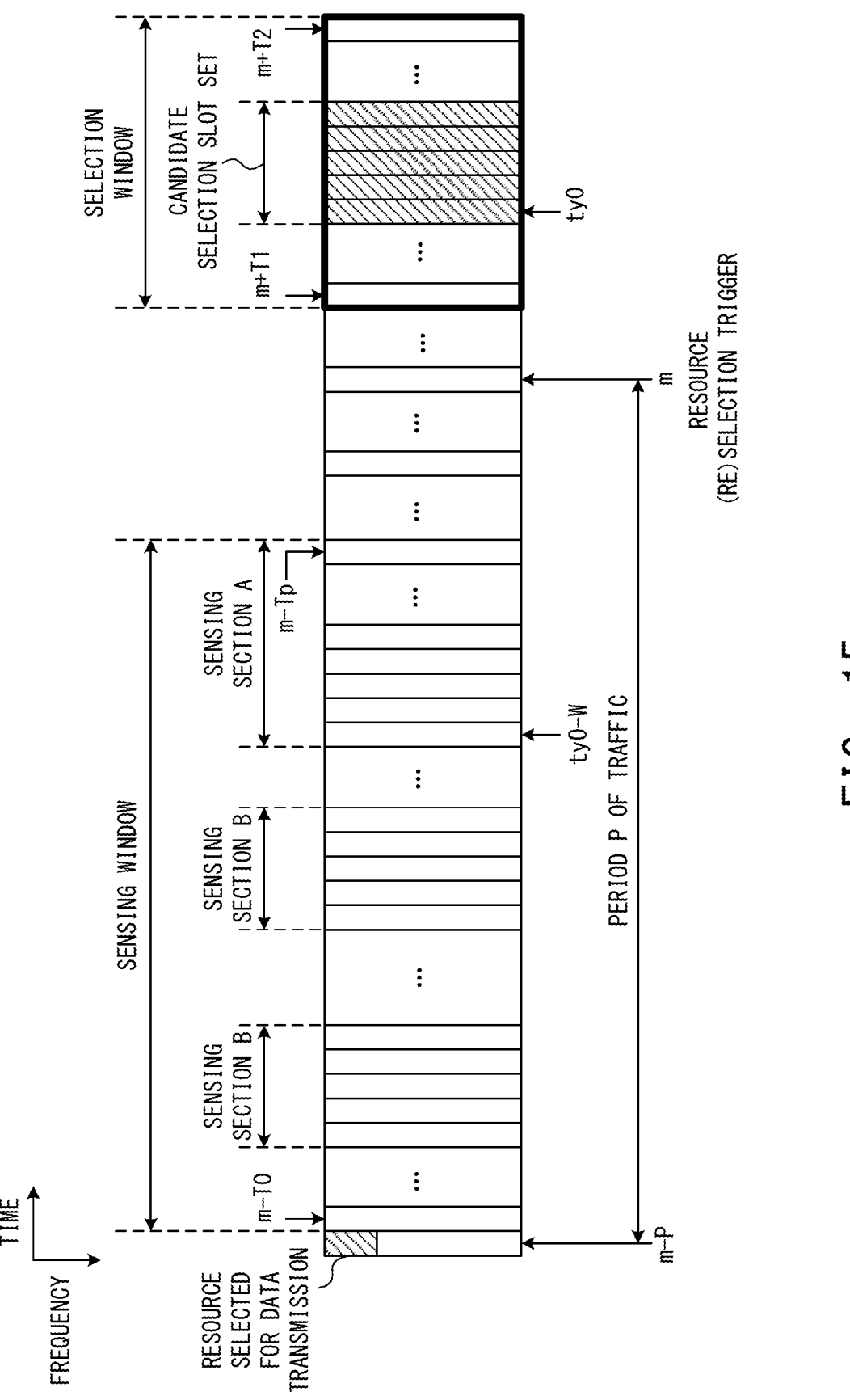
FIG. 15 illustrates an example of prediction of a resource (re)selection trigger.

In addition, the communication device 2 may predict the position of a trigger slot for determining the candidate selection slot set. The trigger slot indicates a slot in which a resource (re)selection trigger or a resource (re)selection instruction is generated. Here, it is assumed that the communication device 2 transmits a D2D signal with a period P. In this case, the communication device 2 can easily predict the timing of transmitting the next D2D signal when the D2D signal is transmitted by using a certain slot. In the example illustrated in FIG. 15, the D2D signal is transmitted in a slot m−P. Then, the communication device 2 predicts the slot m as the next trigger slot.

Once the trigger slot is determined, the candidate selection slot set is configured. In addition, when the candidate selection slot set is configured, the sensing section A for aperiodic traffic is determined as illustrated in FIG. 5, and the sensing section B for periodic traffic is determined as illustrated in FIG. 8. That is, by predicting the next trigger slot, the communication device 2 can determine the sensing section in advance before the resource (re)selection trigger is actually generated. Therefore, the communication device 2 can obtain the sensing result before transmitting the next D2D signal. In addition, the communication device 2 may use a counter to predict the next trigger slot.

In addition, for the first transmission of periodic traffic or aperiodic traffic, the data transmission timing may be predicted based on some assumptions or preconditions. In this case, the communication device 2 may configure the candidate selection slot set based on this prediction. In addition, when a resource pool in which a resource may be randomly selected is prepared, the communication device 2 may select a resource without performing sensing.

When the timing of resource reselection cannot be predicted, it may be difficult for the communication device 2 to perform sensing based on the transmission period illustrated in FIG. 3 or FIG. 8. For example, in the following cases, it is difficult to perform sensing based on the transmission period.

(1) The traffic pattern changes.
(2) The resource pool is reconfigured by the base station.
(3) The selected resource does not meet the requirements (for example, the resource size is too small or the latency is too large).

In this case, the communication device 2 may select a necessary resource from a resource pool in which a resource can be randomly selected without performing sensing. In addition, in periodic traffic, the communication device 2 may randomly select a resource for the first data transmission and select a resource for the subsequent data by using the partial sensing illustrated in FIG. 3 or FIG. 8.

All examples and conditional language provided herein are intended for the pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although one or more embodiments of the present disclosures have been described in detail, it should be understood that the various changes, substitutions, and alterations could be made hereto without departing from the spirit and scope of the disclosure.

What is claimed is:

1. A communication device that supports D2D (Device-to-Device) communication, the communication device comprising:

processor circuitry configured to determine a sensing section for performing sensing based on: a position of a first slot in a candidate selection slot set which includes a slot that is configured to transmit a D2D signal; and information regarding a transmission of an aperiodic traffic, and sensing circuitry configured to perform sensing in the sensing section determined by the processor circuitry, wherein the processor circuitry determines a resource for transmitting the D2D signal in the candidate selection slot set based on a result of the sensing by the sensing circuitry, wherein the sensing section is formed by a plurality of consecutive slots in a sensing window, and a length of the sensing section is shorter than a width based on the information regarding the transmission of the aperiodic traffic.

2. The communication device according to claim 1, further comprising a receiver configured to receive the information regarding a transmission of an aperiodic traffic from a base station.

3. The communication device according to claim 1, wherein the start position of the sensing section is a slot that goes back by a specified time from the first slot, the specified time being indicated by the information regarding a transmission of an aperiodic traffic.

4. The communication device according to claim 3, wherein the specified time indicates a range in which a resource for corresponding retransmission can be reserved for a first transmission of D2D data in a communication system including the communication device.

5. The communication device according to claim 1, wherein the processor circuitry determines an end position of the sensing section based on a transmission instruction of data transmitted by using the resource determined by the processor circuitry.

6. The communication device according to claim 5, wherein the end position of the sensing section is a slot that goes back by a second specified time from the transmission instruction.

7. The communication device according to claim 6, wherein the second specified time indicates a time required for the sensing circuitry to perform sensing.

8. The communication device according to claim 1, wherein the sensing circuitry detects control information indicating a resource reserved by another communication device by decoding a received signal, and the processor circuitry excludes the resource indicated by the control information from resources belonging to the candidate selection slot set, and determines the resource for transmitting the D2D signal among remaining resources in the candidate selection slot set.

9. The communication device according to claim 1, wherein the processor circuitry configures a second sensing section at a position that goes back from the candidate selection slot set by a time indicating a transmission period of D2D traffic designated in advance in a communication system including the communication device, the sensing circuitry performs sensing in the sensing section and the second sensing section, and the processor circuitry determines the resource for transmitting the D2D signal in the candidate selection slot set based on the result of the sensing by the sensing circuitry.

10. A communication method executed by a communication device that supports D2D (Device-to-Device) communication, the communication method comprising:

determining a sensing section for performing sensing based on: a position of a first slot in a candidate selection slot set which includes a slot that is configured to transmit a D2D signal; and information regarding a transmission of an aperiodic traffic, performing sensing in the sensing section; and determining a resource for transmitting the D2D signal in the candidate selection slot set based on a result of the sensing, wherein the sensing section is formed by a plurality of consecutive slots in a sensing window, and a length of the sensing section is shorter than a width based on the information regarding the transmission of the aperiodic traffic.

11. A communication system including a plurality of communication devices that respectively support D2D (Device-to-Device) communication, wherein a first communication device among the plurality of communication devices transmits control information indicating a reserved resource to a correspondent communication device among the plurality of communication devices, a second communication device among the plurality of communication devices determines a sensing section for performing sensing based on: a position of a first slot in a candidate selection slot set which includes a slot that is configured to transmit a D2D signal; and information regarding a transmission of an aperiodic traffic, the second communication device performs sensing in the sensing section, and when the control information is detected in the sensing, the second communication device excludes the resource indicated by the control information from resources belonging to the candidate selection slot set, and determines a resource for transmitting the D2D signal among remaining resources in the candidate selection slot set, wherein the sensing section is formed by a plurality of consecutive slots in a sensing window, and a length of the sensing section is shorter than a width based on the information regarding the transmission of the aperiodic traffic.

12. The communication device according to claim 1, wherein the sensing circuitry is configured to perform sensing during a second sensing period that is set periodically and the processer circuitry is configured to determine, based on results of sensing during the first sensing period and the second sensing period, resources for transmitting a D2D signal from the selection candidate slot set.

* * * * *